United States Patent
Mildren et al.

(10) Patent No.: US 7,635,430 B2
(45) Date of Patent: Dec. 22, 2009

(54) RELATING TO WELL HEAD SEPARATORS

(75) Inventors: Richard Treve Mildren, Barnwood (GB); Neville Ernest Lange, Hucclecote (GB)

(73) Assignee: Axsia Serck Baker Limited, Gloucester (GB)

( * ) Notice: Subject to any disclaimer, the term of this patent is extended or adjusted under 35 U.S.C. 154(b) by 616 days.

(21) Appl. No.: 11/112,573

(22) Filed: Apr. 22, 2005

(65) Prior Publication Data

US 2005/0236324 A1 Oct. 27, 2005

Related U.S. Application Data

(60) Provisional application No. 60/572,436, filed on May 19, 2004.

(30) Foreign Application Priority Data

Apr. 26, 2004 (GB) .................... 0409230.0

(51) Int. Cl.
*B01D 21/26* (2006.01)
*B04C 5/085* (2006.01)

(52) U.S. Cl. .............. 210/512.1; 210/788; 209/715; 209/719; 209/727; 209/734; 166/75.11; 55/459.1

(58) Field of Classification Search ............. 210/788, 210/512.1, 512.2; 209/711, 715, 720, 727, 209/728, 733, 719, 734; 55/459.1; 166/75.1
See application file for complete search history.

(56) References Cited

U.S. PATENT DOCUMENTS

| | | | | |
|---|---|---|---|---|
| 2,816,658 A | * | 12/1957 | Braun et. al. ............. | 210/512.1 |
| 3,348,683 A | | 10/1967 | Wikdahl | |
| 3,404,788 A | | 10/1968 | Woodruff et al. | |
| 3,731,467 A | | 5/1973 | Jennings | |
| 3,988,132 A | | 10/1976 | Oranje | |
| 3,988,239 A | | 10/1976 | Malina | |
| 4,381,868 A | | 5/1983 | Croy et al. | |
| 4,464,264 A | | 8/1984 | Carroll | |
| 4,623,458 A | | 11/1986 | Hakola | |
| 4,956,090 A | * | 9/1990 | Robinson .................. | 210/512.1 |
| 7,185,765 B2 | * | 3/2007 | Hakola ........................ | 209/715 |

FOREIGN PATENT DOCUMENTS

| | | |
|---|---|---|
| CA | 2 388 108 A1 | 10/2003 |
| DE | 1428019 A1 | 11/1968 |
| DE | 102 23 806 A1 | 12/2003 |
| EP | 0-489-625 A1 | 6/1992 |
| GB | 1 397 863 | 6/1975 |
| WO | WO 92/04983 | 2/1992 |

* cited by examiner

*Primary Examiner*—David A Reifsnyder

(57) ABSTRACT

Well head hydrocyclone separators are typically used for separating particulates from fluids such as gas, oil and water and mixtures thereof. Well head separators are useful to prevent wear and blocking of choke valves, rupture of piping, damage to instruments and to prevent vessels from filling with particulate materials. In the present invention, the cyclone separator assembly includes an inlet, an overflow outlet and a segmented cyclone separator tube.

12 Claims, 2 Drawing Sheets

RELATING TO WELL HEAD SEPARATORS

CROSS-REFERENCE TO RELATED APPLICATIONS

This application claims priority from British Appln. No. 0409230.0, filed Apr. 26, 2004, and incorporated herein by reference. The application also claims priority from U.S. Provisional Ser. No. 60/572,436, filed May 19, 2004, incorporated herein by reference.

FEDERALLY SPONSORED RESEARCH OR DEVELOPMENT

Not applicable.

TECHNICAL FIELD

The invention relates to well head hydrocyclone separators which are typically used for separating particulates from fluids such as gas, oil and water and mixtures thereof.

BACKGROUND OF THE INVENTION

The primary reasons for using wellhead separators are to prevent wear and blockage of choke valves, to prevent wear and subsequent rupture of piping, to prevent damage and malfunction of instruments, and to prevent vessels filling with the particulate materials. The wellhead separation duty can include the requirement to separate particles up to 12 to 25 mm in size, and to separate hard abrasive particles. Debris from the perforation of the well casing in the production zone is a common source of large particulate material, and the production of surplus ceramic or garnet propant from well workovers is also a common source of abrasive particulate material.

In wellhead hydrocyclone separators it is common to separate the pressure containing function from the separation function, i.e. to put hydrocyclones in a pressure vessel, because the hydrocyclone will suffer wear, and if the hydrocyclone is itself pressure containing the wear will eventually compromise its pressure containing ability. The very high pressures which may occur at a well head, typically up to 1,400 bar (20,000 pounds per square inch) imposes a practical limit on the diameter of the vessel which may be built to contain the one or more hydrocyclone separators which perform the separation.

Well head hydrocyclone separators may contain a single large hydrocyclone of, say, 300 to 400 mm internal diameter or a number of smaller hydrocyclones of typically around 75 mm (3 inches) internal diameter. The smaller hydrocyclones provide a better separation of small particles than the larger hydrocyclone, whilst in a given diameter of pressure containment vessel a larger hydrocyclone can be designed to pass a higher flowrate than the assembly of small cyclones that could be fitted in the pressure vessel. However, the inlets of the smaller hydrocyclones may not be large enough to pass the 12 to 25 mm particles, whereas the larger hydrocyclone can easily do so.

The disadvantage of larger hydrocyclones is that they cannot be made in such hard wearing materials as small cyclones. Small cyclones for wellhead separators are made from isostatically pressed ceramic powders, for example Aluminas or Sialons, which can achieve hardnesses up to 2000 Hv. The largest parts that can be made by this process have a finished diameter between 200 and 300 mm diameter which is not large enough for the manufacture of a large hycrocyclone. Larger ceramic parts can be made by the reaction bonding process. Reaction bonded ceramic tends to be anisotropic and to contain a large proportion of voids which much reduce its strength and wear properties in comparison to isostatically pressed ceramic. This material has been used to make parts for large hydrocyclones for mineral mining applications, but it has not been widely used in high pressure well head hydrocyclone separators. Instead, larger cyclones for higher pressure applications have tended to be made from ductile and machinable materials so that they can be formed into the hydrocyclone shape. These materials may have hardness's typically between 250 Hv and 400 Hv, but after forming they may have linings of harder materials applied to their interior surfaces, some linings claiming hardness's near to what is achieved in the isostatically pressed ceramics. In service, however, large cyclones constructed as described have proved to be vastly inferior in terms of wear life to small cyclones constructed from isostatically pressed ceramic.

It is common for a large hydrocyclone to have a substantially tangential inlet that is aligned with and fed directly from the inlet port of the separator vessel. As a consequence, all particles tend to be travelling at the same velocity as the incoming fluid, and hence large particles, of e.g. 12-25 mm diameter will have a correspondingly large amount of kinetic energy which will rapidly wear the cylindrical wall of the hydrocyclone, where they first impinge on it.

In separators with a number of small hydrocyclones the fluids are introduced into an inlet chamber of the vessel where they decelerate and must change direction before entering the hydrocyclones. Following this deceleration and change of direction they therefore approach the inlets of the smaller cyclones with a lower velocity and therefore the large particles have a relatively lower kinetic energy as compared to those entering larger hydrocyclones. It is the purpose of the hydrocyclone inlet to accelerate the flow entering the cylindrical section of the hydrocyclone tube to a high velocity, but it is thought that the length of the inlet duct of a small hydrocyclone may be insufficient to allow acceleration of large particles to the same velocity as the fluid is particularly where the fluid is gas or largely gas and is therefore of low density. In separators with a number of small hydrocyclones it is also known that large particles may drop to the bottom of the inlet chamber because the decelerated flow velocity is insufficient to suspend them.

The methods of mounting both the large and the small hydrocyclones in a vessel require a full diameter mechanical joint across the section of the vessel where the hydrocyclones are mounted. This joint is required to be openable and resealable to allow the hydrocyclone tubes to be inspected for wear and replaced.

At the high pressures that the wellhead hydrocyclone separators are required to operate at, the practical limits of conventional technology to provide a suitable joint are being approached. For example, for a vessel with a 600 mm internal diameter and a design pressure of 860 barg it is virtually impossible to make a flanged joint which will hold enough bolts to resist the axial pressure force through the joint, and the large size of the flange becomes an impediment to the function of the separator. Instead, this problem may be solved by means of an annular clamp arrangement having internally disposed cam surfaces which cooperate with correspondingly-shaped surfaces on the outer rim of the respective flanges which are then pinched together by bolts so that, effectively, the jaws of the clamp bear against the entire periphery of the flanges in this region, thereby making for a much stronger and more compact connection than is possible through the use of radially disposed nuts and bolts conventionally used for connecting flanged halves of small bore separator housings together.

The present invention is derived in part from the realisation that whilst it is preferable to utilise single large diameter cyclone separator assemblies in high pressure applications as compared to multiple small bore assemblies to allow higher flow rates through such separators, it would be preferable to arrange for the cyclone tube itself to be segmented.

The present invention is provided to solve the problems discussed above and other problems, and to provide advantages and aspects not provided by prior inventions of this type. A full discussion of the features and advantages of the present invention is deferred to the following detailed description, which proceeds with reference to the accompanying drawings.

SUMMARY OF THE INVENTION

According to a first aspect of the present invention there is provided a cyclone separator assembly comprising a housing having an inlet, an overflow outlet and a cyclone separator tube in which the tube is segmented axially about its major axis.

With this arrangement the segments can have very simple shapes which make them amenable to being made in hard wearing materials. Also as each segment may be manufactured separately to the others, segments which endure less abrasion than others may even be made of a different material, thereby economising on manufacturing costs. Furthermore, whether each segment is made of the same material or not, segments which have worn too much may simply be replaced, rather than having to replace the entire separator tube as is traditionally required.

In another aspect, the invention also provides a cyclone separator assembly having an inlet for directing fluids and particulates into an inlet chamber prior to being directed to the inlet end of a cyclone separator tube, the overflow outlet of the separator assembly initially being disposed centrally within the inlet chamber and being surrounded by a collar acting as an anvil for receiving fluid and particulates initially directed thereagainst by the inlet, the arrangement being such that the particulates impinge upon the collar in preference to the side walls of the inlet chamber, thereby obviating the problem of the side walls of the inlet chamber being substantially worn by the particulates initially impinging directly onto the side walls.

With this arrangement, instead of the inlet being arranged substantially tangentially so as to introduce fluid and particulates into the cylindrical portion of the hydrocyclone in a substantially straight line, it is instead initially directed towards the axis of the separator tube such that after particulates impinge upon the collar their kinetic energy is considerably reduced such that when they thereafter enter the inlet of the cyclone tube their velocity is well below that which they had in the separator vessel inlet port. In turn, this has the additional advantage in ensuring that such particulates are less likely to cause severe abrasion as they pass through the cyclone tube and underflow outlet end.

Conveniently, the segmented cyclone tube is provided within a separator assembly in which the housing is in two halves, each half being held together by an annular clamp having internally disposed cam surfaces co-operable with correspondingly-shaped cam surfaces on the outer periphery of the halves of the housing where they each meet, and a collapsible annular shim is disposed between the inlet end of the cyclone tube and the inlet chamber. With this arrangement, because a segmented cyclone tube must necessarily take account of manufacturing tolerances which become multiplied by the number of segments making up the tube, as the clamp is tightened the collapsible shim collapses to the extent necessary to take up any play in the system. Conveniently, the collapsible shim is in the form of an annular metal tube which includes one or more apertures allowing pressures to equalise inside and outside the tube to prevent it collapsing under fluid pressure.

The cyclone separator assembly may conveniently have an inlet port into the inlet chamber which is inclined relative to the major axis of the separator tube and an overflow outlet exit port which is also inclined relative to the major axis of the separator tube, whereas conventionally the inlet and the overflow outlet are at right angles to the major axis of the separator tube. This has the advantage of enabling the separator assembly to fit in a confined space in which access to the inlet and outlet is limited.

Other features and advantages of the invention will be apparent from the following specification taken in conjunction with the following drawings.

DETAILED DESCRIPTION

Figure 1:
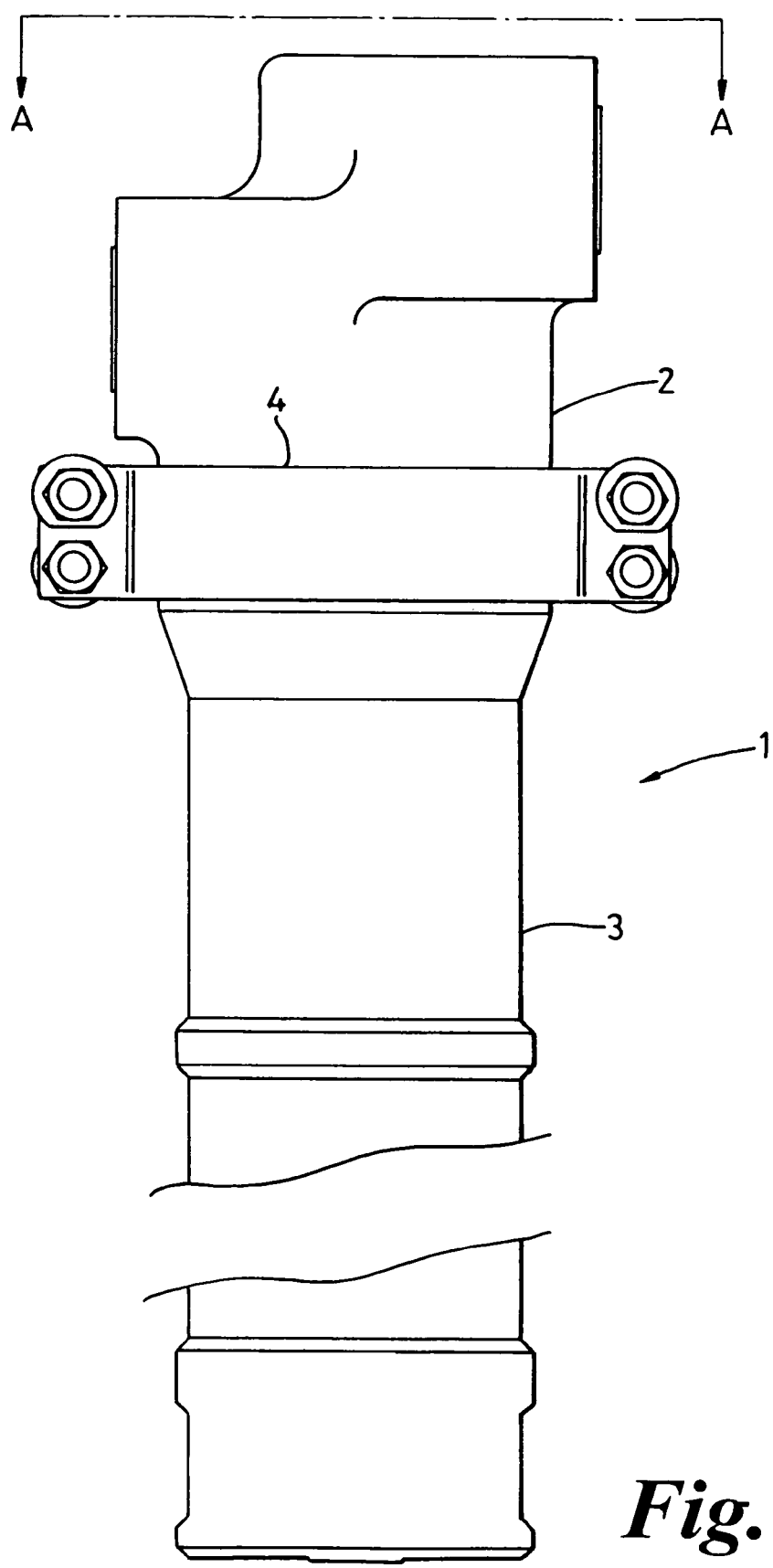
FIG. 1 is a side elevation of a first embodiment of cyclone separator assembly, and, FIG. 2 is a section through "A-A" of the assembly of FIG. 1.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to the Figures, a cyclone separator assembly according to this embodiment of the invention comprises a generally cylindrical housing 1 having upper and lower halves 2, 3 secured together by a generally annular two-part clamp 4 having internally disposed inclined cam surfaces 5 co-operable with correspondingly-shaped cam surfaces 6/7 (shown in FIG. 2) around the flanged periphery of each half of the housing 2, 3 in the region where they abut each other.

Figure 2:
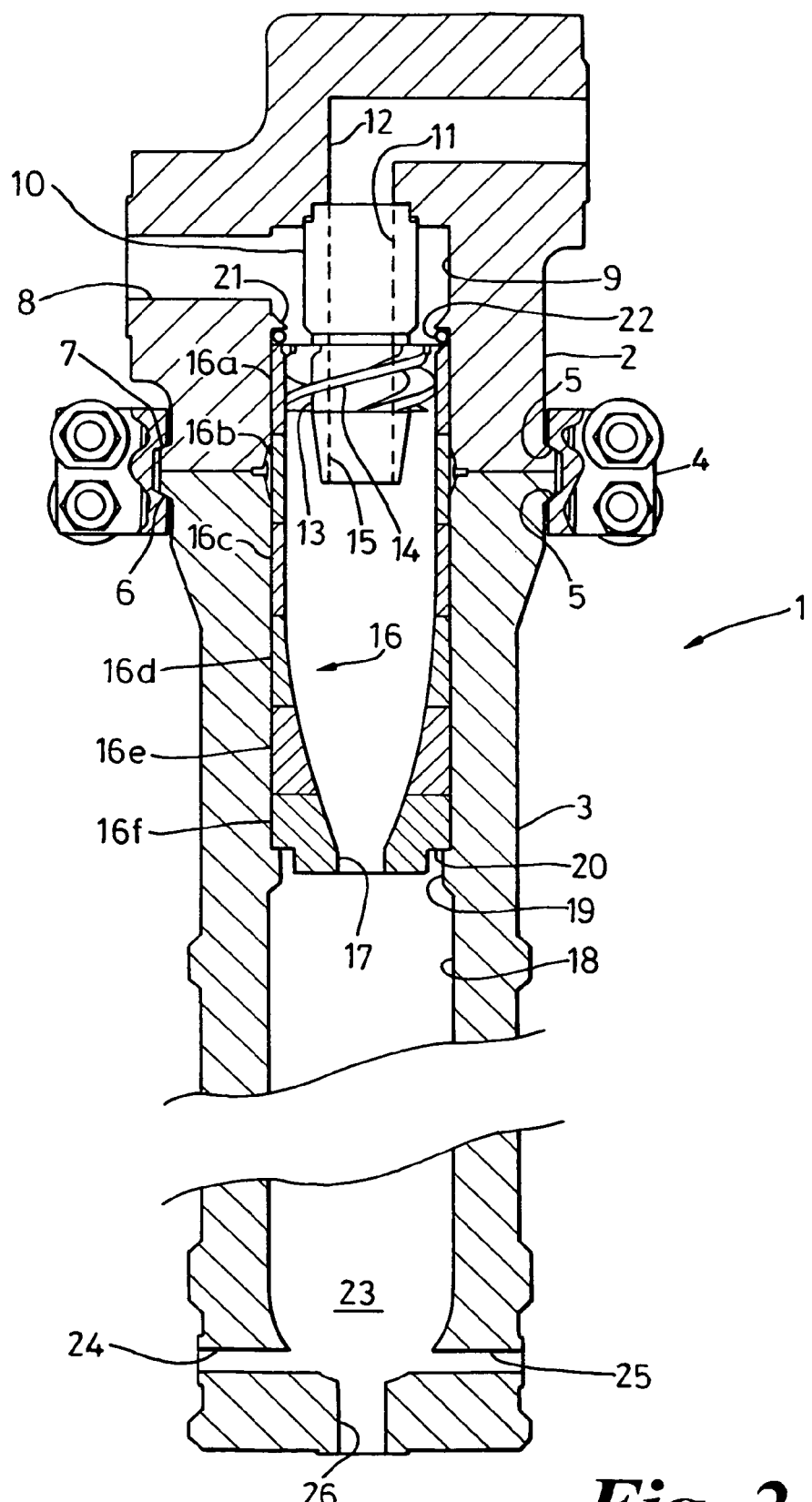

As shown with reference to FIG. 2, in the, upper, housing half 2 is a fluid inlet 8 for directing fluid and particulates contained therein, such as gas containing particles of sand, into a cylindrical inlet chamber 9, within which is coaxially disposed an annular collar 10 having a central bore 11 coaxial with a corresponding bore 12 in the housing 2 comprising part of the overflow outlet of the separator assembly.

Below the collar 10 is a part helically-shaped cyclone separator tube inlet piece 13 having a set of three equi-spaced helical vanes 14 creating helical inlets for directing fluid and particulates in a swirling motion about the exterior of the inlet piece 13, and a central bore 15 coaxial with bores 11 and 12.

The inlet piece 13, which may also be conveniently made of a softer material than the cyclone tube 16 to act as a wear indicator, is received within the inlet end of a generally cylindrical cyclone separator tube 16 comprised of six segments 16a to 16f, segment 16a representing the separator tube inlet, 16b, 16c, 16d and 16e representing intermediate segments of the tube 16 and 16f representing the underflow outlet end having an underflow outlet orifice or bore 17.

The separator tube 16 is mounted in a correspondingly-shaped bore 18 within the housing 1 which includes an inwardly disposed shoulder region 19 in the lower half 3 to which abuts a shoulder region 20 of the cyclone separator tube segment 16f. At the other end of the housing 1 in the upper half 2 is a corresponding shoulder 21 which ensures that the cyclone separator tube 16 and all its respective component segments 16a to 16f are captured within this part of the bore 18 immediately below the inlet chamber 9.

As will be appreciated, manufacturing tolerances for the various segments 16a to 16f can mean that they may be collectively a tight fit or a loose fit within the limits imposed by the shoulder regions 19, 21 and in accordance with another aspect of the invention this potential problem is resolved through the use of an annular hollow shim 22 made of e.g. metal tubing and including apertures therein so that as the clamp 4 is tightened to move the upper and lower halves 2, 3 together the shim 22 deforms to ensure that there is no play in the system.

At the lower end of the separator housing 1 is a sump chamber 23 for collecting particulates such as sand or other debris from the well. To aid in removing the collected materials from this chamber a clean water inlet 24 is provided for injecting clean water into this area of the housing 1, to loosen and fluidise the materials so that they will flow out of the chamber as a slurry via a slurry water outlet 25. For larger particulates a drain outlet 26 is provided which, in use, is normally closed by e.g. a threaded drain plug, a flange, or a proprietary design of high pressure closure plate (not shown).

In operation, fluid such as gas under high pressure enters the inlet 8 and impinges directly on the outer surface of the collar 11 which, for particulates carried by the fluid, therefore acts as an anvil, which partially dissipates their kenetic energy and spreads them out in all directions and reduces the velocity of the particulates to substantially less than the velocity which they had in the separator inlet 8 as they enter the inlet piece 13, to be thereafter guided into a swirl by the vanes 14 into the inside of the cyclone separator tube 16 whereafter, as is well known, dense particles or fluid material become separated from the fluid medium, drifting along the wall of the tube 16 to exit through the underflow outlet 17, the less dense material exiting through the overflow outlet defined by the bores 15, 11 and 12.

As will be apparent, because the collar 11 effectively acts as an anvil for particulates entering the cyclone separator assembly 1 any substantial wear may be detected easily by examining the collar 11 and unlike the situation with prior art cyclone separator assemblies failure of the collar 11 due to wear will not, of itself, constitute catastrophic failure of the entire separator assembly because the sidewalls of the housing 1 in this region are still intact. Where the collar 11 is considered to be too worn for further use it may simply be replaced, and may also be made of a relatively soft material which wears more rapidly than other parts of the hydrocyclone to thereby act as a wear indicator. By this means the user could, for example, know that wear has occurred to the extent of the collar 11 being holed because the efficiency of the hydrocyclone would be reduced by the portion of the flow which passes through the worn collar, rather than by the breaching of the side walls of the pressure containment vessel.

The multiple helical inlets of the inlet piece 13 also introduce the particulates to the cyclone over a greater area of the cyclone wall than in the conventional design with a single inlet, thereby reducing the intensity of particle impingement and hence rate of wear in that area.

The cyclone separator tube 16, being segmented axially into segments of very simple shape, is amenable to manufacture in the widest range of materials and in particular in hard wearing materials. Hard wearing materials also tend to be brittle, and the method of mounting the segments is chosen so that they experience only compressive forces, which effectively eliminates the conditions where a brittle failure can occur, and if a crack should occur, will tend to hold the parts together so that their functioning may not be impaired. Being segmented also allows complex shapes to be introduced to the hydrocyclone profile which are otherwise impossible or difficult to manufacture, such as having smoothly curving inner sidewalls in order to increase aerodynamic/hydrodynamic efficiency.

The segmented nature of the cyclone separator tube 16 also means that individual segments may be replaced without the entire tube 16 being replaced as is conventional practice. Individual segments may even be made of differing materials, for example segment 16a and 16f, representing inlet and outlet, where wear is usually more significant than at intermediate positions, may be made of a harder material than intermediate segments 16b to 16e, or may be made of the same material but may be replaced more often due to wear.

In order to ensure that inlet fluid does not pass into the underflow chamber and thereby reduce the separation efficiency of the hydrocyclone separator tube 16 a seal may conveniently be provided between the shoulder portions 19, 20, such as an O-ring seal.

While the specific embodiments have been illustrated and described, numerous modifications come to mind without significantly departing from the spirit of the invention, and the scope of protection is only limited by the scope of the accompanying Claims.

What is claimed is:

1. A cyclone separator assembly comprising a housing having an inlet, an overflow outlet, a cyclone separator tube in which the tube is segmented axially about its major axis into a plurality of segments, and a collapsible annular shim.

2. The cyclone separator assembly according to claim 1 wherein the housing is in two halves, each half being held together by an annular clamp having internally disposed cam surfaces co-operable with correspondingly-shaped cam surfaces on the outer periphery of the halves of the housing where they each meet.

3. The cyclone separator assembly according to claim 1 wherein a collapsible annular shim is disposed between an inlet end of the cyclone tube and the inlet chamber.

4. The cyclone separator assembly according to claim 3 wherein the collapsible annular shim is disposed between an end of the cyclone separator tube remote from the inlet end and the lower half of the housing.

5. The cyclone separator assembly according to claim 3 wherein the collapsible annular shim is in the form of an annular metal tube having one or more apertures allowing pressures to equalise inside and outside the tube to prevent it collapsing under fluid pressure.

6. The cyclone separator assembly according to claim 1 further comprising an inlet port into an inlet chamber which is inclined relative to the major axis of the separator tube and an overflow outlet exit port which is also inclined relative to the major axis of the separator tube.

7. A cyclone separator assembly comprising a housing having an inlet for directing fluids and particulates into an inlet chamber prior to being directed to an inlet end of a cyclone separator tube, an overflow outlet of the separator assembly initially being disposed centrally within the inlet chamber and being surrounded by a collar acting as an anvil for receiving the fluid and particulates initially directed against the collar by the inlet.

8. The assembly according to claim 7 wherein the housing is in two halves, each half being held together by an annular clamp having internally disposed cam surfaces co-operable with correspondingly-shaped cam surfaces on the outer periphery of the halves of the housing where they each meet.

9. The assembly according to claim 7 wherein a collapsible annular shim is disposed between the inlet end of the cyclone tube and the inlet chamber.

10. The assembly according to claim 7 wherein a collapsible annular shim is disposed between an end of the cyclone separator tube remote from the inlet end and the lower half of the housing.

11. The assembly according to claim 10 wherein the collapsible shim is in the form of an annular metal tube having one or more apertures allowing pressures to equalise inside and outside the tube to prevent it collapsing under fluid pressure.

12. The assembly according to claim 7 further comprising an inlet port into the inlet chamber which is inclined relative to the major axis of the separator tube and an overflow outlet exit port which is also inclined relative to the major axis of the separator tube.

* * * * *